United States Patent
LaFrance-Linden

(10) Patent No.: US 7,895,581 B2
(45) Date of Patent: Feb. 22, 2011

(54) PROFILING COLLECTOR FOR COMPUTER SYSTEM

(75) Inventor: David LaFrance-Linden, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1063 days.

(21) Appl. No.: 11/698,526

(22) Filed: Jan. 26, 2007

(65) Prior Publication Data

US 2008/0183930 A1    Jul. 31, 2008

(51) Int. Cl.
  *G06F 9/44*    (2006.01)
(52) U.S. Cl. .................................. 717/130; 717/158
(58) Field of Classification Search ......... 717/125–133, 717/154–161
See application file for complete search history.

(56) References Cited

PUBLICATIONS

Levon, "Profiling in Linux HOWTO", 2002, retrieved from http://movementarian.org/linux-profiling/, 18 pages.*
Schneider et al., "Unintrusively measuring Linux Kernel Execution Times", Nov. 2005, The Proceeding of the 7th Real-Time Linux Workshop, Lille, pp. 1-5.*
Anderson et al., "Continuous Profiling: Where Have All the Cycles Gone?", Nov. 1997, ACM Transaction on Computer Systems, vol. 15, No. 4, pp. 357-390.*

* cited by examiner

*Primary Examiner*—Ted T Vo

(57) ABSTRACT

In one embodiment a computer system comprises one or more processors and a memory module communicatively connected to the one or more processors. The memory module comprises logic instructions which, when executed on the one or more processors configure the one or more processors to receive an interrupt in an execution thread of a process executing at an application layer of an operating system, intercept the interrupt in a profiling collector module invoked directly from a raw machine state, execute a profiling collection process, and return control from the interrupt to the execution thread when the profiling collection process is complete.

19 Claims, 4 Drawing Sheets

PROFILING COLLECTOR FOR COMPUTER SYSTEM

TECHNICAL FIELD

This application relates to electronic computing, and more particularly to a profiling collector for computer system.

BACKGROUND

Computer systems may include performance profilers that collect data samples relating to performance parameters of the computer system. The accuracy of a performance profiler is related to the number of samples collected by the performance profiler. Increasing the number of samples collected by a performance profiler increases the accuracy of the profiler.

Conventional performance profilers operate within the kernel level of the computer's operating system. Interrupt calls to the operating system require kernel-level processing and processing by a bridge module, which consume processing cycles. Increasing the rate directly slows down applications, and may cause additional indirect slow downs, e.g., due to more frequent cache perturbations. More efficient performance profiler collecting techniques would permit samples to be collected more frequently, thereby increasing the accuracy of the profiled data while keeping application perturbation low.

DETAILED DESCRIPTION

Figure 1:
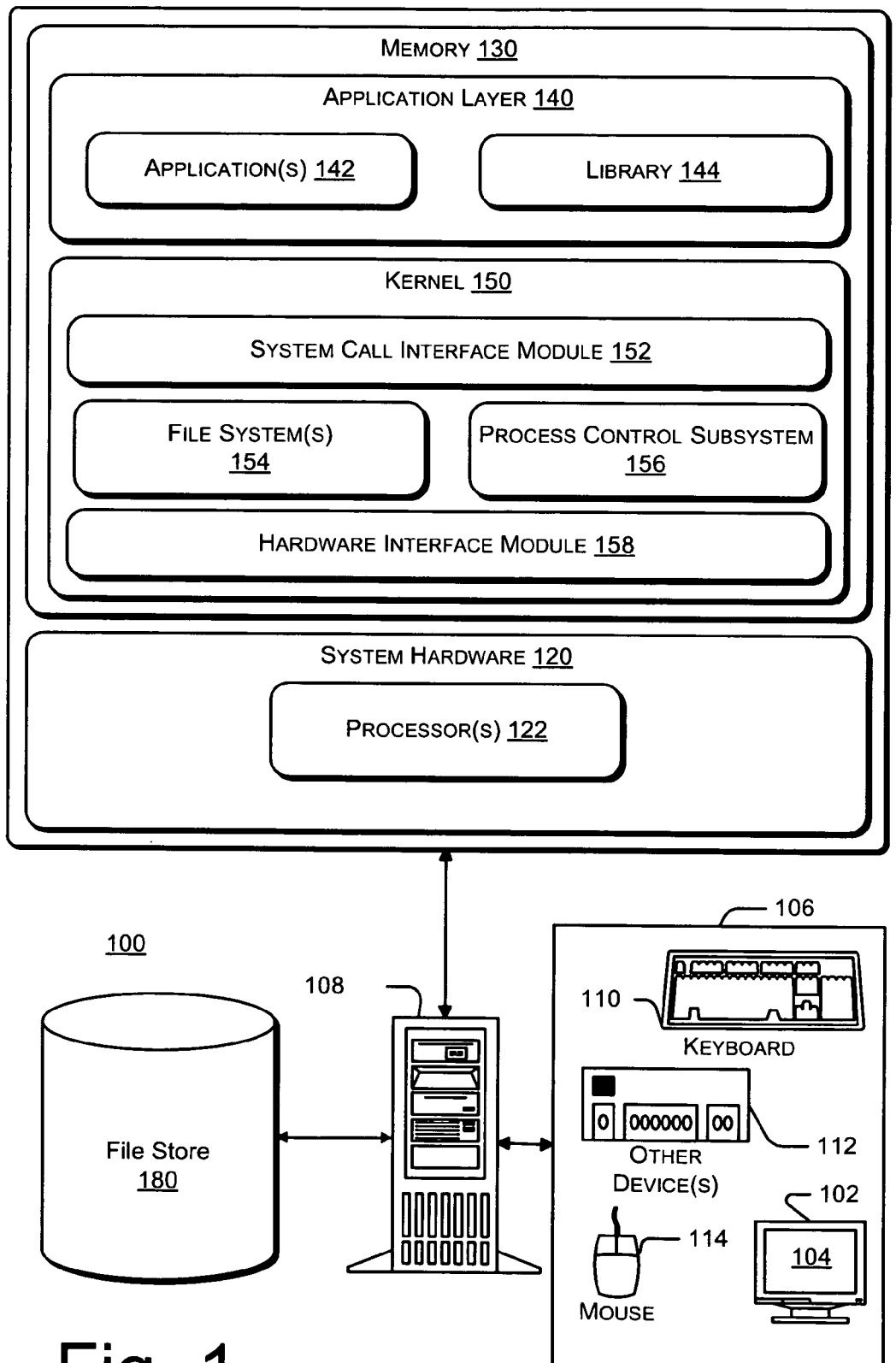
FIG. 1 is a schematic illustration of one embodiment of a computing system adapted to implement a performance profiler.

FIG. 1 is a schematic illustration of an exemplary computer system 100 in which an efficient profiling collector may be implemented. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 including a processor 122 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system for managing operations of computer 108. In some embodiments, the operating system may include an application layer 140, which manages the execution of one or more applications 142, which in turn may utilize the services of one or more libraries 144. The operating system may further include a kernel layer 150, which provides services to applications 142 executing on the application layer 140. In one embodiment, kernel 150 includes a hardware interface module 158 that provides an interface to system hardware 120. In addition, kernel 150 includes one or more file systems 154 that manage files used in the operation of computer 108 and a process control subsystem 156 that manages processes executing on computer 108. Kernel 150 further includes a system call interface module 152 that provides an interface between the operating system and one or more application modules 142 and/or libraries 144.

In operation, one or more application modules 142 and/or libraries 144 executing on computer 108 make calls to the system call interface module 152 to execute one or more commands on the computer's processor. The system call interface module 152 invokes the services of the file system(s) 154 to manage the files required by the command(s) and the process control subsystem 156 to manage the process required by the command(s). The file system(s) 154 and the process control subsystem 156, in turn, invoke the services of the hardware interface module 158 to interface with the system hardware 120.

The particular embodiment of operating system is not critical to the subject matter described herein. Operating system may be embodied as a UNIX operating system or any derivative thereof (e.g., Linux, Solaris, etc.) or as a Windows® brand operating system.

Figure 2:
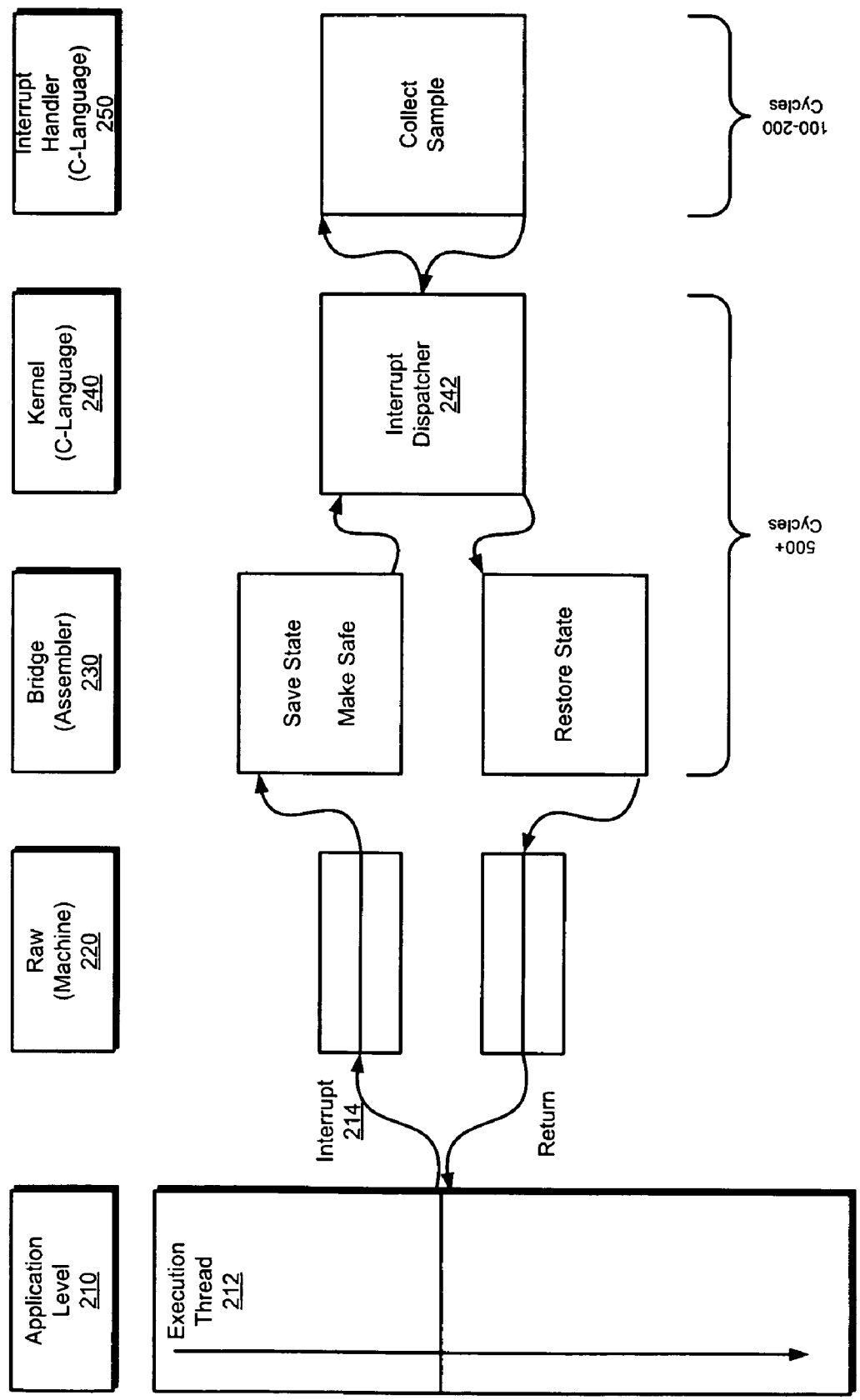
FIG. 2 is a schematic illustration of an architecture for a performance profiler in a computer system.

FIG. 2 is a schematic illustration of an architecture for a performance profiler in a computer system. Referring to FIG. 2, an application executes at the application level 210 of the operating system. The execution thread 212 proceeds until a point in time at which a performance profile interrupt 214 interrupts the execution thread 212. In response to be interrupt, the processor enters a raw interrupt state 220, which invokes an interrupt bridge 230, typically written in assembler language. The bridge 230 saves the current state of the processor and implements a routine to make the computing environment safe before the interrupt is passed to the kernel layer 240.

Kernel layer 240 includes an interrupt dispatcher 242, which schedules and dispatches interrupt tasks. The interrupt dispatcher 242 passes the interrupt to a handler 250, which implements a profile sampling task to collect one or more performance samples from the computer system. When the sample collection task is finished, the handler 250 provides an acknowledgment to the interrupt dispatcher 242, which in turn provides an acknowledgment to the bridge code 230. Bridge code 230 implements a process to restore the state of the processor, then the processor returns to the raw machine state, and restarts execution thread 212. As noted above, bridge and kernel processes typically consume over 500 clock cycles, which represents a significant amount of overhead load to add to the sample collection process, which typically takes between 100 and 200 clock cycles. Thus, removing the need to pass the interrupt through the bridge and kernel would increase the efficiency of the sampling collection process.

Figure 3:
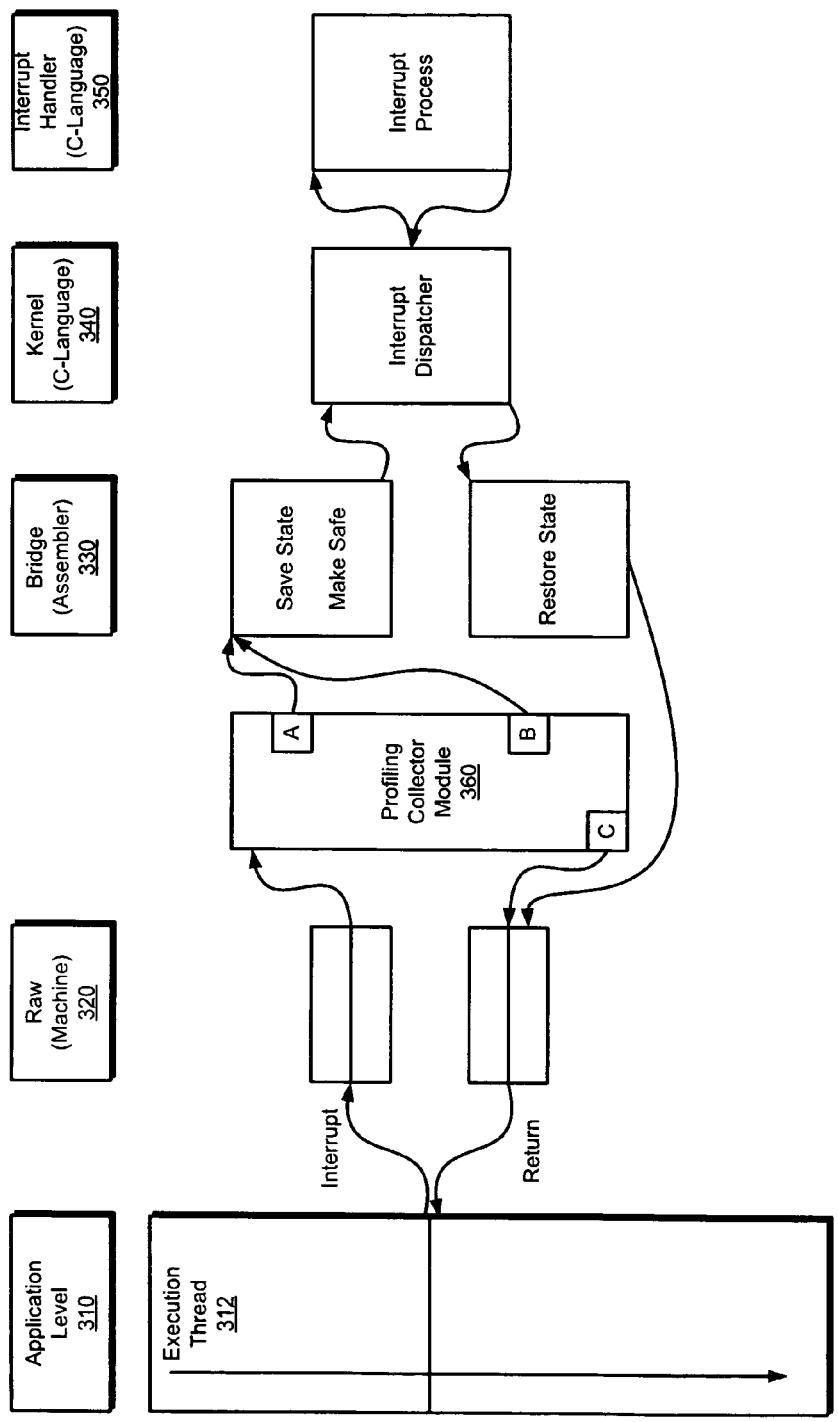
FIG. 3 is a schematic illustration of an architecture for a higher performance profiler in a computer system according to an embodiment.

FIG. 3 is a schematic illustration of an architecture for a performance profiler in a computer system according to an embodiment. Referring to FIG. 3, from an architectural perspective, the architecture depicted in FIG. 3 differs from the architecture depicted in FIG. 2 in that a profiling collector module 360 in interposed in the architecture between the raw machine state 320 and the bridge 330, such that the profiling collector module 360 may be invoked directly from the raw machine state during an interrupt process.

The profiling collector module 360 may be embodied as logic instructions stored in a computer-readable medium. In some embodiments, for example in embodiments adapted for an Intel Itanium architecture (IA-64), the profiling collector module 360 may be written in assembler language and stored in the Interrupt Vector Table (IVT). In response to an interrupt, IA 64 grants the interrupt mechanism a private bank of sixteen registers which the profiling collector module 360 may use. These private registers, used diligently, allow the high performance collector to avoid time and space consuming save/restore operations.

The architecture of FIG. 3 enables the interrupt vector to be redirected to the profiling collector module 360 for performance monitoring interrupts. The interrupt architecture remains otherwise intact. Hence, the original interrupt architecture can be invoked for interrupts other than performance monitoring interrupts, or if the performance sampler needs to invoke a kernel-level handler. Another embodiment could replicate the actions of the bridge code in order to invoke the kernel dispatcher 340 directly.

Figure 4:
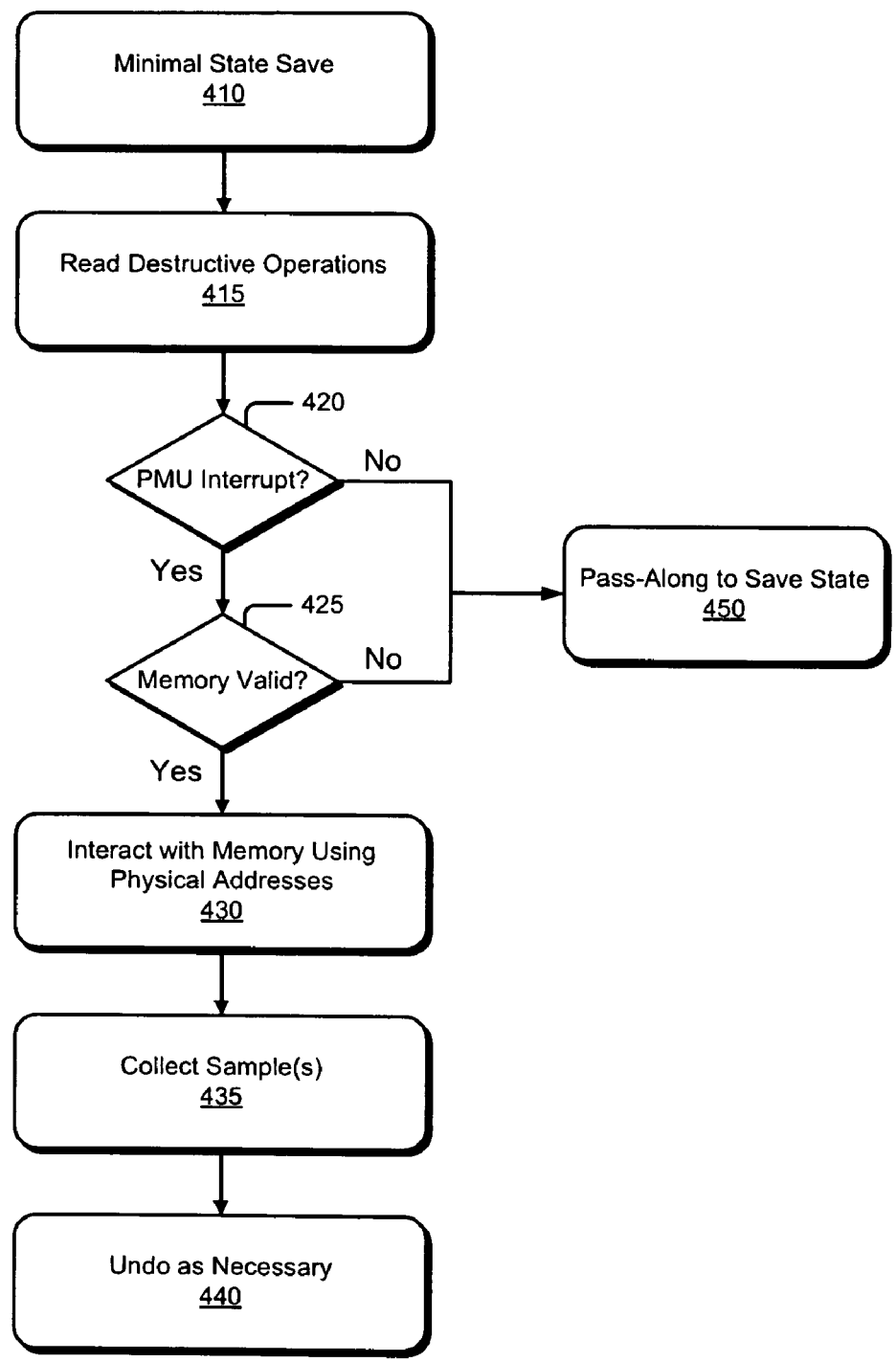
FIG. 4 is a flowchart illustrating operations implemented by a profiling collector module according to an embodiment.

FIG. 4 is a flowchart illustrating operations implemented by a profiling collector module according to an embodiment. Referring to FIG. 4, at operation 410 a minimal save state operation is performed to ensure that the original interrupt mechanism can be rejoined from a performance monitoring interrupt test or in the event that the sampling collector needs to invoke a kernel-level handler. At operation 415 read destructive operations are performed. The nature of the read destructive operations is a function of the interrupt mechanism of a particular processor. For example, in an IA-64 processor the register that contains the interrupt source is read-destructive. For some versions of Linux kernels this requires modifying the bridge code which bridges from the raw CPU state to the kernel to read the register(s) early and pass the contents through to the kernel.

If, at operation 420, the interrupt is not an interrupt that invokes the services of the performance monitoring unit (PMU), then control passes to operation 450 and control of the interrupt thread is passed to the save state operation of the bridge module 330. The interrupt can then rejoin the interrupt code to invoke an appropriate in-kernel interrupt handler. By contrast, if the interrupt does invoke the services of the PMU, then control passes to operation 425.

If, at operation 425, the memory (memory space) addressed in the interrupt is not valid, then control passes to operation 450 and control of the interrupt thread is passed to the save state operation of the bridge module 330. The interrupt can then rejoin the interrupt code to invoke an appropriate in-kernel interrupt handler. By contrast, if the memory is valid, then control passes to operation 430 and the profiling collector module 360 interacts with memory. In some embodiments, physical addresses are used to avoid disallowed memory translation faults. In other embodiments, virtual addresses used by the collector are forced to have translation entries to avoid disallowed memory translation faults. In other embodiments, virtual addresses can be used if memory translation faults are permitted. Data structures are arranged and referenced correspondingly.

At operation 435 the profiling collector unit samples are collected. The particular samples collected may vary between profiling units and computer systems. At operation 440 the profiling collector performs an undo as necessary. For example, after collecting the sample, the collector may need to invoke an in-kernel handler, e.g., to wakeup a thread. The collector needs to ensure the performance monitoring unit is not trying to deliver the sample just collected. The collector may also need to pass other information to the handler, e.g., in the form of flags in the per-CPU memory.

In some embodiments the profiling collector module 360 may be written as a constant component of the interruption vector table (IVT). In other embodiments the profiling collector module 360 may be specifically adapted for a particular computer configuration, or for specific profiling tasks. For example, a computer system may be provided with multiple different profiling collector modules 360, which may be stored in a suitable memory location such as, e.g., memory 130 or file store 180. A particular profiling collector module 360 may be patched into operating memory along with the original interrupt mechanisms. When an interrupt invokes a performance monitoring unit, the interrupt is redirected to the profiling collector module 360. When the profiling collector module 360 is finished, execution branches to the original interrupt code.

For example, on an IA64/Linux platform, an external interrupt causes the CPU to branch to offset 0x3000 of the IVT. The entry at 0x3400 is unused. The original interrupt code at 0x3000, adjusted to read and pass through the read-destructive interrupt vector register (IVR), saves the predicate registers, reads the IVR and executes a no-op. In some embodiments, the no-op is replaced with a branch to the profiling collector module 360. Rejoining is performed by branching to the subsequent bundle with the predicate register values and IVR value in the expected registers.

Interrupts may be turned off to replace a bundle and coordinated between CPUs of the system. A shared memory cell is used to coordinate between CPUs of a system. A master CPU may invoke a routine on all slave CPUs which uses the inter-process interrupt (IPI) mechanism, which is itself an external interrupt. Each slave CPU turns off interrupts and reports its state. When all the slaves have reported, the master, with interrupts off, replaces the bundle, forces it to memory, and releases the slaves. The slaves ensure their CPU will see the replaced bundle, re-enable interrupts, and return. The result is a consistent bundle in the IVT that will invoke the desired PMU collector.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method to collect profile samples in a computer system, comprising:
   receiving an interrupt of an execution thread of a process executing at an application layer of the computer system;
   intercepting the interrupt in a profiling collector module executed in the computer system;
   determining, by the profiling collector module, whether the interrupt is related to performing profiling;
   in response to determining that the interrupt is not related to performing profiling, invoking an in-kernel interrupt handling mechanism at a kernel level of the computer system to handle the interrupt;
   in response to determining that the interrupt is related to performing profiling, the profiling collector module executing a profiling collection process to collect the profile samples while bypassing the in-kernel interrupt handling mechanism; and
   returning control from the interrupt to the execution thread when the profiling collection process is complete.

2. The method of claim 1, wherein the profiling collector module is stored in memory on a processor.

3. The method of claim 1, wherein the profiling collection process interacts directly with physical memory addresses.

4. The method of claim 1, wherein executing the profiling collection process while bypassing the in-kernel interrupt handling mechanism in response to determining that the interrupt is related to performing profiling comprises executing the profiling collection process in response to determining that the interrupt is related to performing profiling and that a memory space addressed by the interrupt is valid, the method further comprising:
  in response to determining that the interrupt is related to performing profiling but that the memory space addressed by the interrupt is invalid, invoking the in-kernel interrupt handling mechanism to perform collecting of the profile samples.

5. The method of claim 1, wherein intercepting the interrupt in the profiling collector module comprises redirecting an interrupt vector corresponding to the interrupt to the profiling collector module.

6. The method of claim 1, further comprising:
  configuring the profiling collector module to be able to invoke the in-kernel interrupt handling mechanism.

7. The method of claim 1, further comprising providing the profiling collector module in an interrupt vector table.

8. The method of claim 1, further comprising:
  after the profiling collector module has executed the profiling collection process to collect the profile samples while bypassing the in-kernel interrupt handling mechanism, the profiling collector module invoking the in-kernel interrupt handling mechanism to perform a task.

9. A computer system, comprising:
  one or more processors;
  a memory module communicatively connected to the one or more processors and comprising logic instructions which, when executed on the one or more processors configure the one or more processors to:
    receive an interrupt of an execution thread of a process executing at an application layer of the computer system;
    intercept the interrupt in a profiling collector module executed in the computer system;
    determine, by the profiling collector module, whether the interrupt is related to performing profiling;
    in response to determining that the interrupt is not related to performing profiling, invoke an in-kernel interrupt handling mechanism at a kernel level of the computer system to handle the interrupt;
    in response to determining that the interrupt is related to performing profiling and that a first condition associated with the interrupt is satisfied, cause the profiling collector module to execute a profiling collection process to collect profile samples regarding performance parameters of the computer system without using the in-kernel interrupt handling mechanism; and
    return control from the interrupt to the execution thread when the profiling collection process is complete.

10. The computer system of claim 9, further comprising:
  an interrupt vector register; and
  logic instructions which, when executed on the one or more processors configure the one or more processors to perform one or more read destructive operations of the interrupt vector register.

11. The computer system of claim 9, further comprising logic instructions which, when executed on the one or more processors configure the one or more processors to cause the profiling collector module to interact directly with physical memory addresses.

12. The computer system of claim 9, wherein the logic instructions when executed on the one or more processors configure the one or more processors to further:
  in response to determining that the interrupt is related to performing profiling but that the first condition is not satisfied, cause the profiling collector module to invoke the in-kernel interrupt handling mechanism to perform collecting of the profile samples.

13. The computer system of claim 12, wherein the first condition comprises a memory space addressed by the interrupt being valid.

14. The computer system of claim 9, wherein interception of the interrupt in the profiling collector module is performed by redirecting an interrupt vector corresponding to the interrupt to the profiling collector module.

15. The computer system of claim 9, wherein the profiling collector module is configured to be able to invoke the in-kernel interrupt handling mechanism under one or more conditions.

16. A computer program product stored on a computer-readable storage medium comprising logic instructions which, when executed on one or more processors, configure the one or more processors to:
  receive an interrupt of an execution thread of a process executing at an application layer of a computer system;
  intercept the interrupt in a profiling collector module executed in the computer system;
  determine whether the interrupt is related to performing profiling;
  in response to determining that the interrupt is not related to performing profiling, invoke an in-kernel interrupt handling mechanism at a kernel level of the computer system to handle the interrupt;
  in response to determining that the interrupt is related to performing profiling and that a first condition associated with the interrupt is satisfied, cause the profiling collector module to execute a profiling collection process to collect profile samples regarding performance parameters of the computer system without using the in-kernel interrupt handling mechanism; and
  return control from the interrupt to the execution thread when the profiling collection process is complete.

17. The computer program product of claim 16, further comprising logic instructions which, when executed on the one or more processors configure the one or more processors to perform one or more read destructive operations of an interrupt vector register.

18. The computer program product of claim 16, wherein the logic instructions when executed on the one or more processors configure the one or more processors to further:
  in response to determining that the interrupt is related to performing profiling but that the first condition is not satisfied, cause the profiling collector module to invoke the in-kernel interrupt handling mechanism to perform collecting of the profile samples.

19. The computer program product of claim 18, wherein the first condition comprises a memory space addressed by the interrupt being valid.

* * * * *